US011873394B2

(12) United States Patent
Matsuoka

(10) Patent No.: US 11,873,394 B2
(45) Date of Patent: Jan. 16, 2024

(54) THERMOPLASTIC RESIN COMPOSITION HAVING SUPERIOR PROCESSABILITY

(71) Applicant: KANEKA AMERICAS HOLDING, INC., Pasadena, TX (US)

(72) Inventor: Yoshiaki Matsuoka, Settsu (JP)

(73) Assignee: KANEKA AMERICAS HOLDING, INC., Pasadena, TX (US)

( * ) Notice: Subject to any disclaimer, the term of this patent is extended or adjusted under 35 U.S.C. 154(b) by 348 days.

(21) Appl. No.: 17/251,453

(22) PCT Filed: Jun. 13, 2019

(86) PCT No.: PCT/US2019/036952
§ 371 (c)(1),
(2) Date: Dec. 11, 2020

(87) PCT Pub. No.: WO2019/241507
PCT Pub. Date: Dec. 19, 2019

(65) Prior Publication Data
US 2021/0246295 A1    Aug. 12, 2021

Related U.S. Application Data

(60) Provisional application No. 62/763,341, filed on Jun. 13, 2018.

(51) Int. Cl.
*C08L 27/06* (2006.01)
*C08L 25/08* (2006.01)
(Continued)

(52) U.S. Cl.
CPC ........... *C08L 27/06* (2013.01); *C08F 212/08* (2013.01); *C08F 220/06* (2013.01);
(Continued)

(58) Field of Classification Search
CPC .......... C08L 27/06; C08L 25/08; C08L 33/02; C08F 212/08; C08F 220/06
See application file for complete search history.

(56) References Cited

U.S. PATENT DOCUMENTS

| 4,424,259 A | 1/1984 | Middlebrook |
| 4,456,733 A * | 6/1984 | Hornbaker ............... C08L 51/00 525/71 |
| 6,162,536 A * | 12/2000 | Montsinger ........... B29C 70/882 264/495 |

FOREIGN PATENT DOCUMENTS

| EP | 0 254 346 B1 | 1/1993 | |
| EP | 3031854 A1 * | 6/2016 | ................ C08J 5/18 |
| EP | 3 031 854 B1 | 6/2018 | |

OTHER PUBLICATIONS

International Search Report and Written Opinion dated Aug. 12, 2019 in PCT/US2019/036952 filed on Jun. 13, 2019.

* cited by examiner

*Primary Examiner* — Vu A Nguyen
(74) *Attorney, Agent, or Firm* — Oblon, McClelland, Maier & Neustadt, L.L.P.

(57) ABSTRACT

A thermoplastic resin composition, including: 100 parts by weight of a thermoplastic resin (A); and 0.1 to 30 parts by weight of a processing aid (B). The processing aid (B) has a styrene-equivalent weight average molecular weight of from 300,000 to 8,000,000, and contains 60 wt % or more of a polymer (B1) obtained by polymerizing monomers comprising from 40 to 99.9 wt % of styrene, 0.1 to 10 wt % of an acid group-containing monomer, and 0 to 59.9 wt % of a vinyl monomer.

20 Claims, 2 Drawing Sheets

(51) Int. Cl.
*C08L 33/02* (2006.01)
*C08F 212/08* (2006.01)
*C08F 220/06* (2006.01)
*C08F 220/18* (2006.01)
*C08F 220/14* (2006.01)
*C08K 3/26* (2006.01)

(52) U.S. Cl.
CPC ...... *C08F 220/14* (2013.01); *C08F 220/1804* (2020.02); *C08K 3/26* (2013.01); *C08K 2003/265* (2013.01); *C08L 2203/30* (2013.01)

THERMOPLASTIC RESIN COMPOSITION HAVING SUPERIOR PROCESSABILITY

BACKGROUND

Field of the Invention

The present invention relates to a thermoplastic resin composition and compound having excellent processability.

Background

There have been several attempts to improve processing ability of thermoplastic resins, and research and development of high filled thermoplastic resins, such as polyvinyl chloride resins, have been implemented for a long time. Those high filled resins may include a relatively large amount of fillers such as, for example, calcium carbonate, talc, and silica, to improve stiffness and heat distortion temperature of the resin and to reduce production cost of the resin. As a filler, glass fibers, Wollastonite, mica may also be used to improve stiffness and heat distortion temperature of the resin. Antimony oxide, aluminum hydroxide, magnesium hydroxide can be used to improve flame retardancy of the resin, and wood powders may be used to provide the resin with wood-like appearance.

A relatively large amount of fillers, such as calcium carbonate, is generally added to polyvinyl chloride resins to manufacture various products such as pipes, sidings, decking, home decorative materials, ceilings, and floorings. Polyvinyl chloride resins containing a large amount of fillers tend to exhibit slow fusion speed and form nonuniformly melted resins, causing defects in the products manufactured by using such resins. The fusion speed of a resin is indicative of processing ability of the resin. The fusion speed of a resin and/or uniformity of a melted resin can be measured by using, e.g., a batch type mixer supplied by Brabender GmbH & Co KG.

A processing aid made of polymethyl methacrylate with a relatively high molecular weight is known in the art, and has been used to improve processing ability of thermoplastic resins such as vinyl chloride resins. A processing aid can be used to advance the timing at which the resin starts to fusion, improve uniformity of the melted resin, control melt viscosity of the resin, and/or reduce processing temperature of the resin, thereby maximizing physical properties of the resin and improving aesthetical properties of products prepared from the resin.

A processing aid is generally used to improve processing ability of polyvinyl chloride resins in various molding methods, such as calendaring molding, extrusion molding, injection molding, blow molding, bottle molding and compression molding. For example, JP H11-166091A describes a processing aid made of methyl methacrylate with a high molecular weight for improving processing ability of polyvinyl chloride type resins. US2013/0122227 A1 describes using a processing aid similar to those described in JP H11-166091A to improve processing ability of a high filled polyvinyl chloride resin. However, these references do not evaluate processing ability of polyvinyl chloride type resins in detail.

Therefore, to address the problems described above, there is a need for processing aids to improve processing ability of high filled thermoplastic resins, such as polyvinyl chloride type resins.

SUMMARY

Accordingly, one object of the present invention is to provide a thermoplastic resin composition including at least one thermoplastic resin (A) and at least one processing aid (B).

In one embodiment, the thermoplastic resin composition includes the at least one thermoplastic resin (A), the at least one processing aid (B), and at least one filler (C).

In another embodiment, the thermoplastic resin composition includes: 100 parts by weight of the at least one thermoplastic resin (A); and 0.1 to 30 parts by weight of the at least one processing aid (B). The processing aid (B) may have a styrene-equivalent weight average molecular weight of from 300,000 to 8,000,000 and any number and range herebetween. The processing aid (B) contains 60 wt % or more of a polymer (B1) obtained by polymerizing monomers comprising from 40 to 99.9 wt % of styrene, 0.1 to 10 wt % of at least one acid group-containing monomer, and 0 to 59.9 wt % of at least one vinyl monomer. In one embodiment, the thermoplastic resin (A) is a vinyl chloride resin.

Another object of the present invention is to provide a thermoplastic resin compound, obtained by melting and kneading the thermoplastic resin composition.

A further object of the present invention is to provide a method of improving processing ability of a thermoplastic resin, including: adding 0.1 to 30 parts by weight of at least one processing aid to 100 parts by weight of at least one thermoplastic resin. The processing aid has a styrene-equivalent weight average molecular weight of from 300,000 to 8,000,000 and any number and range herebetween. The processing aid contains 60 wt % or more of at least one polymer obtained by polymerizing monomers comprising from 40 to 99.9 wt % of styrene, 0.1 to 10 wt % of at least one acid group-containing monomer, and 0 to 59.9 wt % of at least one vinyl monomer.

Another object of the present invention is to provide a method of improving processing ability of a polyvinyl chloride resin composition, including: adding at least one processing aid to a polyvinyl chloride resin composition comprising at least one polyvinyl chloride resin and at least one filler. 0.1 to 30 parts by weight of the processing aid could be added to 100 parts by weight of the polyvinyl chloride resin composition. The processing aid has a styrene-equivalent weight average molecular weight of from 300,000 to 8,000,000 and any number and range herebetween. The processing aid contains 60 wt % or more of at least one polymer obtained by polymerizing monomers comprising from 40 to 99.9 wt % of styrene, 0.1 to 10 wt % of at least one acid group-containing monomer, and 0 to 59.9 wt % of at least one vinyl monomer.

BRIEF DESCRIPTION OF THE DRAWINGS

A more complete appreciation of an object of the present disclosure and many of the attendant advantages thereof will be readily obtained as the same becomes better understood by reference to the following detailed description when considered in connection with the accompanying drawings wherein.

DETAILED DESCRIPTION

Figure 1:
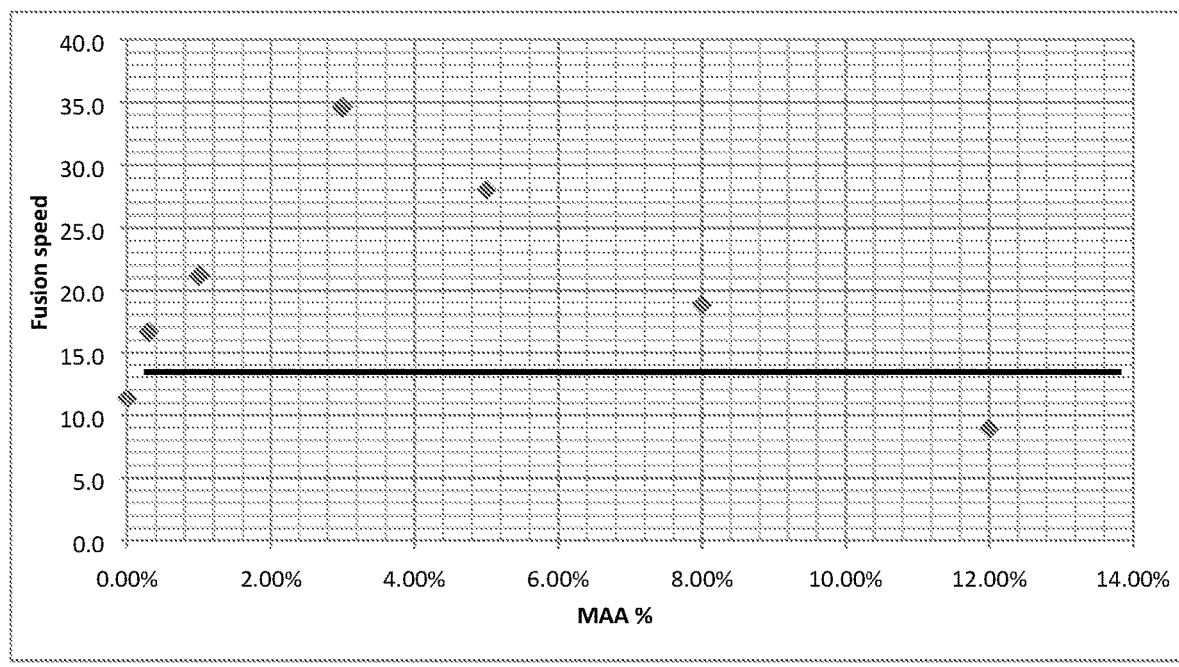
FIG. 1 shows relationship between the fusion speed of the PVC compound and the amount of methacrylic acid added in Step 1 of the production of the Processing Aid in Examples 1 to 5 and Comparative Examples 2 and 3. The plots from left to right: Comparative Example 2, Example 1, Example 2, Example 3, Example 4, Example 5, and Comparative Example 3. The bold line indicates the fusion speed of Comparative Example 1.

All publications, patent applications, patents, and other references mentioned herein are incorporated by reference in their entirety. Further, the materials, methods, and examples are illustrative only and are not intended to be limiting, unless otherwise specified. Further, as used herein, the words "a", "an" and the like generally carry a meaning of "one or more", unless stated otherwise. The drawings are generally drawn to scale unless specified otherwise or illustrating schematic structures or flowcharts.

[Thermoplastic Resin Composition]

The thermoplastic resin composition of the present application includes at least one thermoplastic resin (A) and at least one processing aid (B).

<Thermoplastic Resin (A)>

The thermoplastic resin (A) may be any thermoplastic resin or a combination of thermoplastic resins that can be suitably included in a thermoplastic resin composition. In one embodiment, the thermoplastic resin (A) is a vinyl chloride resin.

The vinyl chloride resin is not particularly limited, and any vinyl chloride resins may be used. A homopolymer of vinyl chloride as well as copolymers composed of units of vinyl chloride and units of other monomers copolymerizable with vinyl chloride are preferred. The copolymer may include 70% by weight or more and less than 100% by weight, preferably 80% by weight or more and less than 100% by weight, of the vinyl chloride units, and greater than 0% by weight and 30% by weight or less, preferably greater than 0% by weight and 20% by weight or less, of the units of other monomers copolymerizable with vinyl chloride.

Examples of the other monomers copolymerizable with vinyl chloride include, for instance, vinyl acetate, propylene, styrene, an acrylic acid ester (e.g., alkyl acrylates having a C1 to C22 alkyl group such as methyl acrylate, ethyl acrylate, butyl acrylate and octyl acrylate), and other vinyl monomers. These vinyl monomers may be used alone or in combination.

Examples of the vinyl chloride resin include, for instance, polyvinyl chloride, copolymers of not less than 80% by weight of units of vinyl chloride units and not more than 20% by weight of units of other copolymerizable monomer(s) such as vinyl acetate, propylene, styrene or an acrylic acid ester, and a chlorinated polyvinyl chloride. These vinyl chloride resins may be used alone or in combination.

The vinyl chloride resin may be produced by any known methods. Examples of the method to produce the vinyl chloride resin include, but are not limited to, an emulsion polymerization method, a microsuspension polymerization method, a suspension polymerization method, a solution polymerization method, and a bulk polymerization method. An emulsion polymerization method, a microsuspension polymerization method, and a suspension polymerization method are preferable, because a product in a powder form, which can be easily handled, can be obtained. A suspension polymerization method is particularly preferable in terms of, in particular, the versatility.

The average degree of polymerization of the vinyl chloride resin is not particularly limited. The vinyl chloride resin may have K value of about 50 to about 80.

In one embodiment, the vinyl chloride resin obtained by the polymerization method may be further modified. A typical example of the modification after the polymerization may include "chlorination." The chlorination process includes, for example, charging chlorine gas into water in which a powder of polyvinyl chloride is dispersed, and applying heat or ultraviolet laser to the water to generate chlorine radicals such that the chlorine radicals react with the polyvinyl chloride.

The amount of the thermoplastic resin (A) is not particularly limited. The thermoplastic resin composition may include from 10 to 90% by weight, preferably from 15 to 80% by weight, more preferably from 25 to 50% by weight, of the thermoplastic resin (A).

<Processing Aid (B)>

The processing aid (B) in the thermoplastic resin composition may be any component or a combination of components that is/are capable of improving processing ability of the thermoplastic resin composition or the vinyl chloride resin. As used herein, the term "processing ability" or "processability" indicates, for instance, a fusion speed of all components of the thermoplastic resin composition, in particular a fusion speed of the vinyl chloride resin with one or more of the other components in the thermoplastic resin composition. The term "processing ability" or "processability" may also indicate the timing at which all components of the thermoplastic resin composition start to fusion, in particular a timing at which the vinyl chloride resin starts to fusion with one or more of the other components in the thermoplastic resin composition. The term "processing ability" or "processability" may also indicate the fusion speed of a resin that can be measured by, e.g., a batch type mixer (lab plasticizer) supplied by Brabender GmbH & Co KG In one embodiment, the processing ability of the vinyl chloride resin may be modified by dispersing the processing aid (B) in the vinyl chloride resin. Preferably, the processing aid (B) is substantially uniformly or evenly dispersed in the vinyl chloride resin.

In one embodiment, a styrene equivalent weight average molecular weight of the total processing aid included in the thermoplastic resin composition may be from 0.3 to 8 million, preferably from 0.5 to 6 million, more preferably from 0.7 to 4 million, more preferably from 1 to 3 million, and more preferably from 1.2 to 2.5 million. When the styrene equivalent weight average molecular weight of the total processing aid in the thermoplastic resin composition is less than 0.3 million, the thermoplastic resin composition may not exhibit desirable fusion speed. When the styrene equivalent weight average molecular weight of the total processing aid in the thermoplastic resin composition is greater than 8 million, the processing aid may not be properly dispersed in the vinyl chloride resin, and the thermoplastic resin composition may not exhibit desirable fusion speed.

A method of measuring the styrene equivalent weight average molecular weight is not particularly limited. Preferred measurement methods are methods utilizing a gel permeation chromatography (GPC). One example of the measurement methods is a method in which tetrahydrofuran (THF) is used as a mobile phase, a GPC system manufactured by Tosoh Corporation (trade name: HLC-8220 GPC)

is used as a system, and TSK guardcolumn Super® HZ-H and TSK gel Super® HZM-H (trade name, a polystyrene gel) manufactured by Tosoh Corporation, are used as a column filler. A styrene equivalent weight average molecular weight can be obtained by this exemplary method using polystyrene. When it is difficult to dissolve the processing aid in THF, the solvent used as the mobile phase can be appropriately changed.

The processing aid (B) includes a polymer (B1), and optionally a polymer (B2) and a polymer (B3). The processing aid (B) may include additional component(s) as long as the processing ability of the thermoplastic resin composition is not impaired.

The polymer (B1) may be obtained by polymerizing monomers including styrene, at least one acid group-containing monomer, and optionally at least one vinyl monomer.
(Styrene)

The polymer (B1) may be obtained by polymerizing monomers including styrene in an amount of from 40 to 99.9% by weight, preferably from 50 to 99.5% by weight, more preferably from 60 to 99% by weight, more preferably from 70 to 98.5% by weight, more preferably from 80 to 98% by weight. While it is not intended to be bound by any particular theory, it is considered that compatibility of styrene and an acid group-containing monomer increases as the amount of the acid group-containing monomer in the monomers increases. However, the compatibility of styrene and the acid group-containing monomer may decrease when too much acid group-containing monomer is used.
(An Acid Group-Containing Monomer)

The acid group-containing monomer is a monomer containing an acid group, preferably a monomer containing a carboxyl group.

Examples of the monomer containing a carboxyl group include, but are not limited to, acrylic acid, methacrylic acid, maleic anhydride, itaconic acid, fumaric acid, and mesaconic acid.

These monomers may be used alone or in combination. Among them, acrylic acid and methacrylic acid are preferred because they are considered to have desirable compatibility with vinyl chloride resins.

The polymer (B1) may be obtained by polymerizing monomers including the acid group-containing monomer in an amount of from 0.1 to 10% by weight, preferably from 0.5 to 10% by weight, more preferably from 1 to 7% by weight, more preferably from 1.5 to 4% by weight, more preferably from 2 to 3% by weight. When the amount of the acid group-containing monomer in the monomers is less than 0.1% by weight, or greater than 10% by weight, the thermoplastic resin composition may not exhibit desirable fusion speed.
(A Vinyl Monomer Other than Styrene)

The vinyl monomer may be any vinyl monomer other than styrene. Examples of the vinyl monomer other than styrene include, but are not limited to, (meth)acrylate monomers, vinyl arenes except styrene, vinyl cyanes, vinyl halides, vinyl acetate, alkenes, and alkynes. As used herein the term "(meth)acrylate" indicates methacrylate, acrylate, or a combination thereof.

Examples of the (meth)acrylate monomers may include, for example, (meth)acrylates having an alkyl group with 1 to 22 carbon atoms such as methyl (meth)acrylate, ethyl (meth)acrylate, propyl (meth)acrylate, butyl (meth)acrylate, 2-ethylhexyl (meth)acrylate, octyl (meth)acrylate, dodecyl (meth)acrylate, stearyl (meth)acrylate, and behenyl (meth)acrylate; acrylates having an alkyl group with 1 to 22 carbon atoms and a hydroxyl group such as 2-hydroxyethyl acrylate and 4-hydroxybutyl acrylate; (meth)acrylates having an epoxy group such as glycidyl (meth)acrylates; and (meth)acrylates having an alkyl group with 1 to 22 carbon atoms and an alkoxy group. The number of carbon atoms of the alkyl group in the (meth)acrylate is not necessarily limited, but, for example, if the number of carbon atoms is more than 22, the polymerizability may sometimes be deteriorated. Thus, (meth)acrylates having an alkyl group with 22 or less carbon atoms are preferably used. (Meth)acrylates having an alkyl group with 1 to 12 carbon atoms are more preferable, and (meth)acrylates having an alkyl group with 1 to 8 carbon atoms are even more preferable because they are considered to have excellent compatibility with the vinyl chloride resin. Methyl (meth)acrylate, ethyl acrylate, and butyl (meth)acrylate are most preferred because of their compatibility with the vinyl chloride resin.

Examples of the vinyl arenes except styrene may include, for example, α-methyl styrene, monochlorostyrene, and dichlorostyrene.

Examples of the vinyl cyanides may include, for example, acrylonitrile, and methacrylonitrile. Acrylonitrille is preferred because of its better compatibility with vinyl chloride resins.

Examples of the vinyl halides may include, for example, vinyl chloride, vinyl bromide, and vinyl fluoride. When the thermoplastic resin (A) includes a vinyl chloride resin, the vinyl halides are compounds other than vinyl chloride.

Examples of the alkenes may include, for example, ethylene, propylene, butene, butadiene, and isobutene.

Examples of the alkynes may include, for example, acetylene.

The vinyl monomers may be used alone or in combination.

The polymer (B1) may be obtained by polymerizing monomers including the vinyl monomer other than styrene in an amount of from 0 to 59.9% by weight, preferably from 0 to 49.9% by weight, more preferably from 0 to 39.9% by weight, more preferably from 0 to 29.9% by weight, more preferably from 0 to 19.9% by weight.

In one embodiment, the polymer (B1) may be obtained by polymerizing monomers including: 40 to 99.9% by weight of styrene, 0.1 to 10% by weight of the acid group-containing monomer, and 0 to 59.9% by weight of the vinyl monomer other than styrene; preferably 50 to 99.5% by weight of styrene, 0.5 to 10% by weight of the acid group-containing monomer, and 0 to 49.9% by weight of the vinyl monomer other than styrene; more preferably 60 to 99% by weight of styrene, 1 to 7% by weight of the acid group-containing monomer, and 0 to 39.9% by weight of the vinyl monomer other than styrene, further more preferably 70 to 98.5% by weight of styrene, 1.5 to 4% by weight of the acid group-containing monomer, and 0 to 29.9% by weight of the vinyl monomer other than styrene, and even further more preferably 80 to 98% by weight of styrene, 2 to 3% by weight of the acid group-containing monomer, and 0 to 19.9% by weight of the vinyl monomer other than styrene.

The polymer (B1) may be produced by reacting all monomer components of the polymer (B1) at the same time, or reacting the monomer components at multiple stages. For example, when a large scale production is desired, a seed latex may be prepared by reacting a part of the monomer components, and additional monomer components may be added to the seed latex to further polymerize the monomers to stably produce the polymer (B1).

The amount of the polymer (B1) in the thermoplastic resin composition may be greater than 60% by weight, preferably greater than 65% by weight, more preferably greater than 70% by weight, more preferably greater than 75% by weight, based on the total weight of the processing aid. When the amount of the polymer (B1) in the processing aid is 60% by weight or less, the thermoplastic resin composition may not exhibit desirable fusion speed.

A glass transition temperature (Tg) of the polymer (B1) may be from 60 to 150° C., preferably from 70 to 140° C., more preferably from 80 to 130° C., more preferably from 90 to 120° C.

When the glass transition temperature of the polymer (B1) is less than 60° C., the thermoplastic resin composition may not exhibit desirable fusion properties, a snow ball issue may occur during formation of a thermoplastic resin compound, and a uniformly melted resin may not be formed. When the glass transition temperature of the polymer (B1) is greater than 150° C., the processing aid (B) may not be properly or evenly dispersed in the vinyl chloride resin, and the thermoplastic resin composition may not exhibit desirable fusion properties and processing ability.

The glass transition temperature (Tg) of the polymer (B1) may be measured by a differential scanning calorie analysis or a dynamic viscoelasticity measurement. The glass transition temperature Tg in this disclosure is a value calculated from a Fox formula using values described in Polymer Hand Book (J. Brandrup, Interscience 1989). For example, Tg of polymethyl methacrylate is 105° C., Tg of polybutyl acrylate is −54° C., and Tg of polymethacrylic acid is 228° C.

Polymer (B2)

In addition to the polymer (B1), the processing aid (B) may include a polymer (B2) in an amount of, for example, 0 to 30% by weight and any number and range herebetween. A glass transition temperature (Tg) of the polymer (B2) may be less than 40° C.

The polymer (B2) may be obtained by polymerizing monomers including from 20 to 80% by weight of a methacrylate monomer, 20 to 80% by weight of an acrylate monomer, and 0 to 40% by weight of a vinyl monomer other than styrene. Preferably, the monomer (B2) may be obtained by polymerizing monomers including from 30 to 70% of methacrylate monomer, 30 to 70% by weight of an acrylate monomer, and 0 to 30% by weight of a vinyl monomer other than styrene.

The (meth)acrylate monomers and the vinyl monomers that may be used to prepare the polymer (B1) may also be used to prepare the polymer (B2).

When the processing aid (B) includes an appropriate amount of the polymer (B2), the polymer (B2) may melt faster than the polymer (B1). The melted polymer (B2) may help the polymer (B1) work earlier, thereby promoting the fusion speed of the thermoplastic resin composition.

Polymer (B3)

In addition to the polymer (B1), the processing aid (B) may further include a polymer (B3) in an amount of, for example, 0 to 40% by weight. A glass transition temperature (Tg) of the Polymer (B3) may be greater than 60° C.

The polymer (B3) may be obtained by polymerizing monomers including from 70 to 100% by weight of a methacrylate monomer, 0 to 30% by weight of an acrylate monomer, and 0 to 30% by weight of a vinyl monomer other than styrene. The (meth)acrylate monomers and the vinyl monomers that may be used to prepare the polymer (B1) may be used to prepare the polymer (B3).

The processing aid (B) may include the polymer (B1) alone, the polymers (B1) and (B2), the polymers (B1) and (B3), or the polymers (B1), (B2), and (B3).

The processing aid (B) may be produced by any known method. Examples of the method to produce the processing aid (B) include, but are not limited to, a bulk polymerization method, a melt polymerization method, a solution polymerization method, a suspension polymerization method, a microsuspension polymerization method, a dispersion polymerization method, or an emulsion polymerization method. Among them, a microsuspension polymerization method, a dispersion polymerization method, or an emulsion polymerization method are preferable to improve dispersibility of the processing aid (B) into the vinyl chloride resin. An emulsion polymerization method is particularly preferable.

The amount of the processing aid (B) is not particularly limited. The thermoplastic resin composition may include from 0.01 to 25% by weight, preferably from 0.1 to 15% by weight, more preferably from 0.2 to 5% by weight, of the processing aid (B).

The thermoplastic resin composition preferably includes 0 to 40 parts by weight, more preferably 0 to 20 parts by weight, of the processing aid (B), with respect to 100 parts by weight of the thermoplastic resin (A).

<Filler (C)>

Examples of the Filler (C) in the thermoplastic resin composition may include, but are not limited to, calcium carbonate, calcium oxide, calcium hydroxide, zinc oxide, zinc hydroxide, zinc carbonate, zinc sulfate, magnesium oxide, magnesium hydroxide, magnesium carbonate, magnesium perchlorate, aluminum oxide, aluminum hydroxide, sodium perchlorate, sodium aluminosilicate, amorphous aluminosilicate, hydrotalcite, hydrocalumite, barium perchlorate, metal silicates, such as aluminum silicate, magnesium silicate, calcium silicate, barium silicate, and silica, silicic anhydride, zeolite, activated clay, talc, clay, red oxide, asbestos, antimony trioxide, glass beads, mica, sericite, glass flakes, asbestos, wollastonite, potassium titanate, PMF (Piqua materials fillers), gypsum fibers, xonotlite, MOS (Magnesium oxysulfate whisker), phosphate fibers, glass fibers, carbon fibers, aramid fibers, cellulose fibers, and wood powders that can be used separately or in combination. Among them, calcium carbonate, talc, magnesium hydroxide, cellulose fibers, and wood powders are preferred for better interaction with the processing aid (B).

The amount of the filler (C) included in the thermoplastic resin composition is not particularly limited. The thermoplastic resin composition may include 5 to 800 phr, preferably 10 to 600 phr, more preferably 60 to 350 phr, further more preferably 70 to 100 phr of the filler (C) in the thermoplastic resin composition. As used herein, the unit "phr" indicates parts per hundred parts of all resins included in the thermoplastic resin composition.

<Other Additives and Resins>

The thermoplastic resin composition of the present application may further include a plasticizer, a stabilizer for the vinyl chloride resin, a compounding agent, a thermoplastic resin other than the thermoplastic resin (A), and an elastomer, as long as the effects of the invention are not impaired.

(Plasticizer)

The thermoplastic resin composition may optionally include at least one plasticizer. Any known plasticizers may be used, and examples of the plasticizer include, but are not limited to, phthalic acid ester plasticizers such as di(n-butyl) phthalate, di(n-octyl)phthalate, di(2-ethylhexyl)phthalate, diisooctyl phthalate, octyldecyl phthalate, diisodecyl phthalate, butylbenzyl phthalate, and di(2-ethylhexy)isophthalate; phosphoric acid ester plasticizers such as tributyl phosphate, tri(2-ethylhexyl)phosphate, (2-ethylhexyl)diphenyl phosphate, and tricresyl phosphate; adipic acid ester plasticizers such as di(2-ethylhexyl)adipate, diisodecyl adipate, (n-octyl) (n-decyl)adipate, and (n-heptyl) (n-nonyl)adipate; sebacic acid ester plasticizers such as dibutyl sebacate, di(2-ethylhexyl)sebacate, dioctyl sebacate, and diisooctyl sebacate; azelaic acid ester plasticizers such as di(2-ethylhexyl)azelate, dihexyl azelate, and diisooctyl azelate; citric acid ester plasticizers such as triethyl citrate, triethyl acetylcitrate, tributyl citrate, tributyl acetylcitrate, and tri(2-ethylhexyl)acetylcitrate; glycolic acid ester plasticizers such as methyl phthalyl ethylglycolate, ethyl phthalyl ethylglycolate, and butyl phthalyl butylglycolate; trimellitic acid ester plasticizers such as tri(2-ethylhexyl)trimellitate, trioctyl trimellitate, di(n-octyl)mono(n-decyl)trimellitate, and diisooctyl monoisodecyl trimellitate; ricinoleic acid ester plasticizers such as methylacetyl ricinoleate, and butylacetyl ricinoleate; glycerol plasticizers such as glycerol diacetomonolaurate, glycerol monoacetomonostearate, and medium chain fatty acid triglyceride; epoxy plasticizers such as epoxidized soybean oil, epoxidized linseed oil, and epoxidized (2-ethylhexyl)ester of tall oil fatty acid; polyester plasticizers such as (1,3-butanediol)(2-ethylhexanol) adipate polyester, (1,6-hexanediol)(2-ethylhexanol)sebacate polyester, and (propyleneglycol) (coconut oil fatty acid) adipate polyester.

The amount of the plasticizer is not particularly limited, as long as the properties of the thermoplastic resin composition are not impaired. For a plasticized flooring formulation, the thermoplastic resin composition may include 5 to 100 phr, preferably 10 to 50 phr, more preferably 15 to 35 phr, of the plasticizer. For a plasticized sheet formulation, the thermoplastic resin composition may include 10 to 100 phr, preferably 15 to 60 phr, more preferably 20 to 50 phr, of the plasticizer. When the amount of plasticizer is too small, the thermoplastic resin composition may not have sufficient softness. When the amount of the plasticizer is too large, the thermoplastic resin composition may cause bleeding-out issues.

(Stabilizer for Vinyl Chloride Resin)

In one embodiment, the thermoplastic resin composition may contain at least one stabilizer for the vinyl chloride resin. Since the vinyl chloride resin tends to have a relatively low decomposition temperature, it is preferable that the thermoplastic resin composition contains at least one stabilizer for the vinyl chloride resin. A kind and amount of the vinyl chloride resin are not particularly limited, as long as the processing ability of the thermoplastic resin composition is not impaired.

The stabilizer may be any known stabilizer. For example, metal soap stabilizers, lead salt stabilizers, metal liquid stabilizers, organotin stabilizers, and non-metal stabilizers may be used alone or in combination.

The metal soap stabilizer may be used in combination with another stabilizer to obtain a synergistic effect, or an effect larger than the effect of a single use of a stabilizer. Examples of the metal soap stabilizer may include calcium stearate, barium stearate, and zinc stearate.

The lead salt stabilizer may have a strong heat stability and an excellent weatherability. Examples of the lead salt stabilizer may include tribasic lead sulfate, and dibasic lead phosphite.

The metal liquid stabilizer may have a good compatibility with a resin or a plasticizer and may be capable of decreasing the softening temperature. Thus, the metal liquid stabilizer can be suitably used for soft applications. Examples of the metal liquid stabilizer may include Ba/Zn stabilizers and Ca/Zn stabilizers.

The organotin stabilizer may have excellent heat resistance and weatherability, similar to the lead salt stabilizer. The organotin stabilizer may have a large gelation promoting effect on the vinyl chloride resin. Examples of the organotin stabilizer may include laurate, maleate, and mercapride (or mercapto) stabilizers.

The non-metal stabilizer may be a compound having substantially no metal or having no metal at all. The non-metal stabilizer may be important when the stabilizer is assembled without lead. Specific examples thereof may include epoxy compounds, phosphites, and β-diketone compound.

Other stabilizers may include polyhydric alcohols such as sorbitol, trimethylol propane, pentaerithritol; N-containing compounds such as diphenylthiourea, p-aminocrotonic acid esters, 2-phenyl indole, and dicyandiamide; and hydrotalcites.

In one embodiment, lead salt stabilizers are not desirable for the health and environment, and organotin stabilizers are preferred to the lead salt stabilizers. Stabilizers not containing lead and tin, such as Ca/Zn stabilizers, are most preferred in terms of the health and environment.

Preferably, an amount of the stabilizer is as small as possible, in terms of the sanitary purposes. In a preferred embodiment, a minimum amount of the stabilizer necessary for molding is used. Specifically, the amount of the stabilizer may be from 0.1 to 5 parts by weight, preferably from 0.1 to 4 parts by weight, more preferably from 0.5 to 4 parts by weight, even more preferably from 1 to 4 parts by weight, particularly preferably from 1 to 3.5 parts by weight, based on 100 parts by weight of the vinyl chloride resin. When the amount of the stabilizer is less than 0.1 parts by weight based on 100 parts by weight of the vinyl chloride resin, the heat stability may sometimes be insufficient. When the amount of the stabilizer is more than 5 parts by weight based on 100 parts by weight of the vinyl chloride resin, sticking or plate-out may occur during molding, bleeding-out from the molded article may occur, the transparency may be insufficient, or an eluting amount is too large in an elution test.

(Compounding Agent)

Any compounding agents that are usually added to a resin composition may be used without any limitation. Examples of the compounding agent may include fillers, reinforcements, anti-oxidants, ultraviolet absorbents, flame retardants, anti-static agents, lubricants, stabilizers, coloring agents, fungicidal microbicides, surface-treating agents, ant repelling agents, repellents for mice, reodorants, releasing agents, fluidity improving agents, compatibilizers, melt-viscosity controlling agents, light diffusing agents, antifouling agents, antifogging agents, nucleating agents, and infrared absorbents.

Any known antioxidants may be used, and examples thereof may include phenol antioxidants exemplified by 2,6-di-tert-butyl-para-cresol; amine antioxidants exemplified by phenyl-p-naphthylamine; sulfur antioxidants exemplified by lauryl stearyl thiodipropionate; phosphorus antioxidants exemplified by tridecyl phosphite; hydrazine antioxidants exemplified by N-salicyloyl-N'-aldehydehydrazine; amide antioxidants exemplified by N,N'-diphenyl oxide; acid antioxidants exemplified by phosphoric acid and citric acid.

Any known ultraviolet absorbents may be used, and examples thereof may include benzophenone ultraviolet absorbents, salicylate (benzoate) ultraviolet absorbents, benzotriazole ultraviolet absorbents, and cyanoacrylate ultraviolet absorbents. Examples of the ultraviolet absorbent may also include metal complex salts, which are used as a quencher, and hindered piperidine, which is used as a hindered amine light stabilizer (HALS).

Any known flame retardants may be used, and examples thereof may include halogen flame retardants exemplified by tetrabromobisphenol A and brominated polystyrene; phosphorus flame retardants, which are capable of improving the flame retardance when combined with a halogen flame retardant, exemplified by antimony trioxide, triphenyl phosphate, tricresyl phosphate, and resorcinol bis(diphenylphosphate); and inorganic flame retardants exemplified by aluminum trihydroxide and magnesium dihydroxide. Phosphorus flame retardants are preferred because they generally have excellent compatibility with the resin component (A) and exhibit softening effects.

Any known anti-static agents may be used, and examples thereof may include cationic active agent-type anti-static agents exemplified by primary amine salts, tertiary amines, and quaternary ammonium compounds; anionic active agent-type anti-static agents exemplified by sulfonated oil, soap, alkyl sulfate salts, alkyl benzene sulfonates, phosphate salts; nonionic active agent-type anti-static agents exemplified by partially fatty acid esters of polyhydric alcohol, ethylene oxide adducts of aliphatic alcohol, and ethylene oxide adducts of alkyl naphthol; and amphoteric active agent-type anti-static agents exemplified by carboxylic acid derivatives and imidazoline derivatives. Similarly, various polymer-type anti-static agents may be used.

Any known lubricants may be used, and examples thereof may include hydrocarbon lubricants exemplified by paraffin and polyethylene wax; aliphatic acid lubricants exemplified by higher fatty acids and hydroxy fatty acids; fatty acid amide lubricants exemplified by fatty acid amide and alkylene bisfattyacid amide; ester lubricants exemplified by lower alcohol esters of fatty acid and polyglycol ester; alcohol lubricants exemplified by aliphatic alcohols and polyglycol; polymer lubricants exemplified by various metal soaps and silicone.

Any known nucleating agents may be used, and examples thereof may include higher fatty acid amides, urea derivatives, sorbitol compounds, boron nitride, higher fatty acid salts, and aromatic fatty acid salts. Among them, higher fatty acid amides, urea derivatives, and sorbitol compounds are preferable, as they are considered to be highly effective as a nucleating agent.

Each of the compounding agents described above may be used alone or in combination.

(Thermoplastic Resin Other than the Thermoplastic Resin (A))

The thermoplastic resin other than the thermoplastic resin (A) may include, for example, polyester resins; polycarbonate resins; polyamide resins; polyacetal resins; polyvinyl acetal resins; polyketone resins; polyolefin resins; and vinyl polymer or copolymer resins obtained by polymerization or copolymerization of one or more vinyl monomers selected from the group consisting of diene compounds, maleimide compounds, aromatic alkenyl compounds, methacrylic acid esters, acrylic acid esters, and vinyl cyanide compounds. They may be used alone or in combination.

The polyester resins may be exemplified by resins obtained by polycondensation of a dicarboxylic acid or a derivative thereof such as an alkyl ester with a diol; resin obtained by polycondensation of a monomer having both of a carboxylic acid or a derivative thereof such as an alkyl ester, and a hydroxyl group in one molecule; and resins obtained by ring-opening polymerization of a monomer having a cyclic ester structure in one molecule.

The dicarboxylic acid forming the polyester resin may include terephthalic acid, isophthalic acid, naphthalene dicarboxylic acid, succinic acid, adipic acid, and sebacic acid. The diol may include ethane diol, propane diol, butane diol, pentane diol, neopentyl glycol, hexane diol, and cyclohexane dimethanol. The monomer having both of a carboxylic acid or a derivative thereof such as an alkyl ester and a hydroxyl group in one molecule may include lactic acid. The monomer having a cyclic ester structure in one molecule may include caprolactone.

Specific examples of the polyester resin may include polymethylene terephthalate, polyethylene terephthalate, polypropylene terephthalate, polytetramethylene terephthalate, polybutylene terephthalate, polyhexamethylene terephthalate, polycyclohexanedimethylene terephthalate, poly(ethylenecyclohexenedimethylene)terephthalate, glycol modified polyethylene terephthalate, polyethylene naphthalate, polytrimethylene naphthalate, polybutylene naphthalate, polycyclohexanedimethylene naphthalate, polyarylate, polylactic acid, polysuccinic acid ethylene, polysuccinic acid butylene, polyadipic acid butylene, poly-ε-caprolactone, poly(α-oxyacid), and copolymers thereof. In the present invention, glycol modified polyethylene terephthalate, polylactic acid, polysuccinic acid ethylene, polysuccinic acid butylene, polyadipic acid butylene, poly-ε-caprolactone, and poly(α-oxyacid) are particularly preferable, because they have excellent compatibility with the thermoplastic resin (A). Copolymers of these resins are also preferable.

The polycarbonate resins may be obtained by reacting a dihydric phenol with phosgene or a carbonate precursor, and may include aromatic polycarbonate resins and aliphatic polycarbonate resins. Any of them may be used, and the aliphatic polycarbonate resins are preferable in terms of the compatibility with the thermoplastic resin (A) and the decomposition temperature. The polycarbonate resins may also be copolymers with a polyamide-polycarbonate resin or a polyester-polycarbonate resin.

The polyamide resins may include polyamides obtained from an aliphatic, alicyclic, or aromatic diamine and an aliphatic, alicyclic, or aromatic dicarboxylic acid, polyamides obtained by a ring-opening polymerization of a lactam such as ε-caprolactam or ω-dodecalactam, or polyamides obtained from 6-aminocaproic acid, 1,1-aminoundecanoic acid, 1,2-aminododecanoic acid, or the like in which the polyamides may be homopolymers, copolymers of the polyamide, and blends thereof. The aliphatic polyamide resins are preferable in terms of the compatibility with the thermoplastic resin (A) and the decomposition temperature. Among the aliphatic polyamide resins, nylon-6, nylon-6,6, nylon-11, nylon-12, nylon-6,10, nylon-4,6, copolymers thereof, and blends thereof, which are industrially produced at a low cost and in a large amount, are more preferable. From the same viewpoint, nylon-11 and nylon-12 are even more preferable.

The polyacetal resin refers to a polyoxymethylene, which includes homopolymer-type resins, copolymer-type resins, and block-polymer-type resins. A copolymerizable component in the copolymer and block-polymer may include oxyethylene, oxytrimethylene, and oxytetramethylene. The copolymer-type resins are preferable in terms of the compatibility with the thermoplastic resin (A) and the decomposition temperature.

The polyvinyl acetal resin refers to a polyvinyl alcohol modified with an aldehyde, and may include polyvinyl formal, and polyvinyl butyral.

The polyketone resins may include aromatic polyketones, alicyclic polyketones, aliphatic polyketones. The aliphatic polyketones are preferable in terms of the compatibility with the thermoplastic resin (A) and the decomposition temperature. Examples of the aliphatic polyketones may include alternating copolymers of ethylene and carbon monoxide, and alternating copolymers of an α-olefin and carbon monooxide.

The polyolefin resins may include polymers from an olefin alone exemplified by polyethylene, polypropylene, polymethylpentene, polybutene, cycloolefinpolymer, and copolymers thereof, as well as copolymers of an olefin and copolymerizable compound having at least one double bond copolymerizable with the olefin. The copolymerizable compound may include (meth)acrylic acid and its esters, maleic acid and its esters, maleic anhydride, vinyl acetate; vinyl chloride, and carbon monooxide. Preferably, the copolymerizable compound is included in an amount of 40% by weight or less in the polyolefin resin.

There are several methods to disperse the polyolefin resin in the thermoplastic resin (A). The polyolefin resin is divided into a non-reactive type and a reactive type. The non-reactive type is a type which does not react with the vinyl chloride resin, and the reactive type is a type which is reacted with the vinyl chloride resin.

The non-reactive type may include ethylene-vinyl acetate copolymers, ethylene-vinyl acetate-carbon monooxide copolymers, ethylene-acrylic acid ester-carbon monooxide copolymers, and ethylene-vinyl chloride copolymers. The non-reactive type polyolefin resins generally have good compatibility with the thermoplastic resin (A), and thus they can easily form alloy with the thermoplastic resin (A) simply by melt-kneading.

The other vinyl resins may include polymer and copolymer resins obtained by polymerization or copolymerization of one or more monomers selected from the group consisting of diene compounds, maleimide compounds, aromatic alkenyl compounds, methacrylates, acrylates, and vinyl cyanide compounds.

The polymer and copolymer resins may include polystyrene resins, s-polystyrene resins, polymethyl methacrylate resins, polychlorostyrene resins, polybromostyrene resins, poly-α-methyl styrene resins, styrene-acrylonitrile copolymer resins, styrene-methyl methacrylate copolymer resins, styrene-maleic anhydride copolymer resins, styrene-maleimide copolymer resins, styrene-N-phenyl maleimide copolymer resins, styrene-N-phenyl maleimide-acrylonitrile copolymer resins, methyl methacrylate-butyl acrylate copolymer resins, methyl methacrylate-ethyl acrylate copolymer resins, styrene-acrylonitrile-α-methyl styrene terpolymer resins, butadiene-styrene copolymer (HIPS) resins, acrylonitrile-butadiene rubber-styrene copolymer (ABS) resins, acrylonitrile-acrylic rubber-styrene copolymer (ASA), acrylonitrile-ethylene propylene rubber-styrene copolymers, acrylonitrile-ethylene propylene diene rubber-styrene copolymers, acrylonitrile-butadiene rubber-α-methyl styrene copolymer resins, and aromatic alkenyl compound-diene-vinyl cyanide-N-phenyl maleimide copolymer resins.

Among the other vinyl resins described above, the polymethyl methacrylate resins, styrene-acrylonitrile copolymer resins, acrylonitrile-butadiene rubber-styrene copolymer (ABS) resins, acrylonitrile-acrylic rubber-styrene copolymers (ASA), acrylonitrile-ethylene propylene rubber-styrene copolymers, and acrylonitrile-ethylene propylene diene rubber-styrene copolymers are preferable in terms of the compatibility with the thermoplastic resin (A) and the decomposition temperature.

The processable upper limit temperature, when considering the decomposition temperature of the vinyl chloride resin, is about 220° C.

The amount of the thermoplastic resin other than the thermoplastic resin (A) is preferably 40 parts by weight or less, more preferably 30 parts by weight or less, even more preferably 20 parts by weight or less, particularly preferably 10 parts by weight or less, based on 100 parts by weight of the thermoplastic resin (A). The thermoplastic resins other than the thermoplastic resin (A) are secondarily used in order to, e.g., keep the quality balance of the resin composition. When the amount of the thermoplastic resin other than the thermoplastic resin (A) is more than 40 parts by weight, the softness and mechanical properties of the thermoplastic resin composition may sometimes be deteriorated.
(Elastomer)

The elastomer may include any natural rubbers or synthetic rubbers, alone or in combination. The synthetic rubbers may include, for example, acrylic rubbers such as butyl acrylate rubber, ethyl acrylate rubber, and octyl acrylate rubber; nitrile rubbers such as a butadiene-acrylonitrile copolymer; chloroprene rubber, butadiene rubber, isoprene rubber, isobutylene rubber, styrene-butadiene rubber, methyl methacrylate-butyl acrylate block-copolymers, styrene-isobutylene block-copolymers, styrene-butadiene block-copolymers, hydrogenated styrene-butadiene block-copolymers, ethylene-propylene copolymers (EPR), hydrogenated ethylene-butadiene copolymers (EPDM), ethylene-vinyl acetate copolymers, ethylene-vinyl acetate-carbon monooxide copolymers, polyurethane, chlorosulfonated polyethylene, silicone rubbers (millable type and room temperature vulcanizable type), butyl rubbers, fluororubbers, olefin thermoplastic elastomers, styrene thermoplastic elastomers, urethane thermoplastic elastomers, polyamide thermoplastic elastomers, polyester thermoplastic elastomers, and fluorine-containing thermoplastic elastomers.

Rubbers having a multiple bond in its structure can form an alloy structure capable of expressing the sufficient quality due to the dynamical cross-linking, even if the compatibility with the thermoplastic resin (A) is low.

Among the elastomer described above, methyl methacrylate-butyl acrylate block-copolymer, ethylene-vinyl acetate copolymer, ethylene-vinyl acetate-carbon monooxide copolymer, and urethane thermoplastic elastomer are preferable, and the ethylene-vinyl acetate-carbon monooxide copolymer is particularly preferable, because of its excellent compatibility with the thermoplastic resin (A).
[Thermoplastic Resin Compound]

The thermoplastic resin compound of the present application may be prepared by compounding the thermoplastic resin composition.

The thermoplastic resin compound may be a non-melted compound obtained by mixing the components of the thermoplastic resin composition as starting materials, without melting them, or may be a granular compound, which has a shape capable of being easily molded, obtained by compressing, sticking, and/or completely melting the non-melted compound. The starting materials may be added at once, or added in any order. When the starting materials have different shapes, for example, pellets, a powder, and liquid, it is preferable to add them by using multiple feeders.

Any known method may be utilized for preparing the non-melted compound, and examples thereof may include methods using a mixer such as a Henschel mixer or a tumbler. Any known method may also be utilized for preparing the granular compound, and examples thereof may include methods using a kneader such as a roll compaction machine, a gear pelletizer, Banbury mixer, or various extruders.

Preferably, to distribute the processing aid (B) in the thermoplastic resin (A), the thermoplastic resin (A) is first mixed and/or kneaded with a stabilizer to stabilize the thermoplastic resin (A), and then the processing aid (B) and the filler (C) is added and mixed and/or kneaded together. In one embodiment, a mixture of the thermoplastic resin (A), the stabilizer, the processing aid (B), and the filler (C) is mixed, kneaded, or melt-kneaded until a uniform and solid compound is formed. When the mixture of the thermoplastic resin (A), the stabilizer, the processing aid (B), and the filler (C) is melt-kneaded and a uniform and solid compound is obtained, the compound is cooled to, e.g., a room temperature.

[Method for Improving Processing Ability of a Thermoplastic Resin]

One aspect of the present application is a method for improving processing ability of a thermoplastic resin by adding a processing aid. The thermoplastic resin may contain a filler, and in one embodiment, the thermoplastic resin contains a relatively large amount of filler with respect to the amount of the thermoplastic resin.

The thermoplastic resin, the processing aid, and the filler in the method may be identical to the thermoplastic resin (A), the processing aid (B), and the filler (C) described above.

All ranges described in this application include all values and subvalues therebetween.

Having generally described this invention, a further understanding can be obtained by reference to certain specific examples which are provided herein for purposes of illustration only, and are not intended to be limiting unless otherwise specified.

EXAMPLES

The following examples illustrate the preparation of the thermoplastic resin composition and compound of the present invention. Unless otherwise indicated, the terms parts and percent refer to parts by weight and percent by weight, respectively, when used in these examples and elsewhere in the specification and claims.

In the following examples, the unit "phr" indicates parts by weight of total monomers, and the term "monomer" indicates a chemical substance which includes at least one double bond. In the following examples, monomers are butyl acrylate, styrene, methacrylic acid, and methyl methacrylate.

<Preparation of Processing Aid N0>
(Preparation of Seed Latex)

230 phr of purified water and 2 phr of sodium dioctylsuccinate were added to a reactor. Nitrogen flow was introduced in the reactor to keep nitrogen in gas phase and stirring is started. The reactor temperature was increased to 70° C. 0.1 phr of potassium perfulfate was added to the reactor, and thereafter 2 phr of butyl acrylate and 2 phr of styrene were added to the reactor. The reactants in the reactor were left to stand for 30 minutes. Then, over the period of 240 minutes, 48 phr of butyl acrylate and 48 phr of styrene were continuously added to the reactor through a first charge line of the reactor, and 2 phr of sodium dioctylsuccinate was continuously added to the reactor through a second charge line of the reactor. The reactor temperature was increased to 80° C., and the mixture in the reactor was left for 3 hours. After the reaction, the reactor temperature was reduced to 40° C. A latex having a particle size of 615 Å and a conversion rate from monomer to polymer of 99.2% was obtained (Seed Latex).

In preparation of the Seed Latex, 1 phr is equal to 10 grams.

(Measurement of Conversion from Monomer to Polymer)

A latex was dried up in an oven at 120° C. with vacuum for 1 hour. Monomers and purified water were evaporated during this drying process. Then, the weight of the solid obtained after the drying process was measured. The solid content was calculated by the following equation:

Solid content (SC)=WS/WL

WL: latex weight
WS: solid weight

Conversion rate from monomer to polymer is obtained by the following equation:

Conversion rate=(WT×SC−WR)/WM

WM: Weight of total monomers (total monomers include butyl acrylate, styrene, methacrylic acid, and methyl methacrylate)
WR: Weight calculated by (weight of total ingredients−weight of purified water−weight of monomers)
WT: Weight of total ingredients (Measurement of Latex Particle Size)

The latex particle size refers to the volume average particle size (μm) obtained by measuring the core-shell polymer in a latex state using a MICROTRAC UPA 150 device manufactured by Nikkiso Co., Ltd.

(Step 1)

460 phr of purified water, 1 phr of sodium dioctylsuccinate, 1 phr of the Seed Latex as a solid content, and 0.2 phr of tripotassium phosphate, were added to a reactor, and 84 phr of a monomer mixture including 79.55 phr of styrene, 0.252 phr of methacrylic acid, and 4.2 phr of butyl acrylate was also added to the reactor. Stirring was started and reactor temperature was increased to 65° C. The nitrogen line is put into the mixture in the reactor and the mixture was bubbled by nitrogen for 1 hour. Then, the bubbling by nitrogen was stopped. Then, nitrogen flow is started to keep nitrogen in gas phase in the reactor. 1 phr of sodium dioctylsuccinate and 0.005 phr of potassium perfulfate were added to the reactor, and left for 12 hours. After the reaction, the reactor temperature was increased to 80° C., and left to stand for 1 hour.

In the Step 1, 1 phr is equal to 10 grams.

(Step 2)

To the reactor containing the reactants produced in Step 1, 15 phr of a monomer mixture including 7.5 phr of butyl acrylate and 7.5 phr of styrene were added, and 0.03 phr of potassium perfulfate was also added to the reactor. The mixture in the reactor was left for 3 hours. After the reaction, the reactor temperature was reduced to 40° C. A latex having a particle size of 2231 Å and a conversion rate from monomer to polymer of 98.8% was obtained (Latex).

In the Step 2, 1 phr is equal to 10 grams.

(Coagulation)

The obtained Latex was continuously added dropwise into a 5% by weight solution of calcium chloride for 10 minutes with stirring while maintaining the temperature at 65° C. The Latex was coagulated to aggregate to form a slurry containing particles. In the slurry, the particle size may be observed by eyes, and an average particle size is from a few hundred to a several hundred micrometer. After formation of the slurry, the temperature was increased to 95° C. The slurry was dehydrated, dried, and sieved by a 18 mesh sieve to form Processing Aid N0 in the powder form.

<Preparation of Processing Aids N1 to N5 and C1 and C2>

Processing Aids N1 to N5 and C1 and C2 were prepared by the same process as Processing Aid N0 except that different amounts of methacrylic acid and styrene were employed in the Step 1.

Specifically, Processing Aid N1 was prepared by adding 84 phr of a monomer mixture including 78.96 phr of styrene, 0.84 phr of methacrylic acid, and 4.2 phr of butyl acrylate to the reactor in the Step 1.

Processing Aid N2 was prepared by adding 84 phr of a monomer mixture including 77.28 phr of styrene, 2.52 phr of methacrylic acid, and 4.2 phr of butyl acrylate to the reactor in the Step 1.

Processing Aid N3 was prepared by adding 84 phr of a monomer mixture including 75.60 phr of styrene, 4.2 phr of methacrylic acid, and 4.2 phr of butyl acrylate to the reactor in the Step 1.

Processing Aid N4 was prepared by adding 84 phr of a monomer mixture including 73.08 phr of styrene, 6.72 phr of methacrylic acid, and 4.2 phr of butyl acrylate to the reactor in the Step 1.

Processing Aid N5 was prepared by adding 84 phr of a monomer mixture including 69.72 phr of styrene, 10.08 phr of methacrylic acid, and 4.2 phr of butyl acrylate to the reactor in the Step 1.

Processing Aid C1 was prepared by adding 84 phr of a monomer mixture including 79.8 phr of methyl methacrylate and 4.2 phr of butyl acrylate to the reactor in the Step 1.

Processing Aid C2 was prepared by adding 84 phr of a monomer mixture including 79.8 phr of styrene and 4.2 phr of butyl acrylate to the reactor in the Step 1.

<Preparation of Processing Aids N6 to N10 and C3>

Processing Aids N6 to N10 and C3 were prepared by the same process as Processing Aid N0 except that different composition and/or amount of the monomer mixture and varying reaction temperatures were employed in the Step 1.

Specifically, in Processing Aids N6 and N8-10, 79 phr of a monomer mixture including 72.64 phr of styrene, 2.37 phr of methyl methacrylate, and 3.95 phr of butyl acrylate was added to the reactor in the Step 1. The reactor temperatures during the reaction in Processing Aids N6 and N8-N10 were 65° C., 80° C., 70° C., and 60° C., respectively. After the reaction, the reactor temperature was increased to 80° C., and left to stand for 1 hour.

In Processing Aid N7, 79 phr of a monomer mixture including 72.64 phr of styrene, 2.37 phr of methyl methacrylte, 3.95 phr of butyl acrylate, and 0.03 phr of tertiary dodecyl mercaptan was added to the reactor in Step 1. The reactor temperature during the reaction was 80° C.

In Processing Aid C3, 79 phr of a monomer mixture including 72.64 phr of styrene, 2.37 phr of methyl methacrylate, 3.95 phr of butyl acrylate, and 0.20 phr of tertiary dodecyl mercaptan was added to the reactor in Step 1. The reactor temperature during the reaction was 80° C.

(Measurement of Molecular Weight)

The styrene-equivalent weight average molecular weight of Processing Aids was measured by using tetrahydrofuran (THF) as a mobile phase, a GPC system manufactured by Tosoh Corporation (trade name: HLC-8220 GPC) as a system, and TSK guardcolumn Super HZ-H and TSK gel Super HZM-H (trade name, a polystyrene gel) manufactured by Tosoh Corporation as a column filler.

<Production of Thermoplastic Resin Compound>

Production of PVC Compound Type 1 (Examples 1 to 12 and Comparative Examples 1 to 6)

PVC compound type 1 was prepared from the composition shown in Table 1. In Table 1, 1 phr is equal to 10 grams.

TABLE 1

| Code | Product name | Chemical name | Manufacturer | phr |
|---|---|---|---|---|
| PVC (K61) | Kanevinyl S1008 | PVC homo polymer (K value = 61) | KANEKA CORPORATION | 90 |
| PVC-VA (K58) | Kanevinyl MB1008 | PVC - Vinyl acetate copolymer (K value = 58, Vinyl acetate = 10%) | KANEKA CORPORATION | 10 |
| DOP | DOP-MS | Dioctyl phthalate | J-PLUS Corporation | 25 |
| CaZn | NAFTSAFE CZ3017 | Calcium zinc stabilizer | Chemson | 3 |
| DSM-1 | STABINEX DSM-1 | Mixture of Lubricant and stabilizer | MIZUSAWA INDUSTRIAL CHEMICALS | 2 |
| $CaCO_3$-A | Whiten B | Calcium carbonate Non-surface treated Average particle size = 3.6 micrometer | SHIRAISHI CALCIUM | 70 or 100** |
| Processing Aid* | | | | 2.5 |

*As the Processing Aid, one of Processing Aids N0 to N10 and C1 to C3 was used.
**70 phr of $CaCO_3$-A was used in Examples 1 to 10 and Comparative Examples 1 to 4. 100 phr of $CaCO_3$-A was used in Examples 11 and 12 and Comparative Examples 5 and 6.

To produce PVC compound type 1, PVC (K61), PVC-VA (K58), and CaZn were added to a henschel mixer and mixed. DOP was continuously added to the mixer for a period of 1 minute, and the temperature was started to increase by flowing a stream in a jacket of the mixer. DSM-1 was added at 60° C.; the Processing Aid and $CaCO_3$-A were added at 90° C.; and the mixer was stopped at 105° C. The temperature of the resulting compound (PVC compound type 1) was reduced to 80° C. by cooling the water in the jacket.

Production of PVC Compound Type 2 (Example 7 and Comparative Example 13)

PVC compound type 2 was prepared from the composition shown in Table 2. In Table 2, 1 phr is equal to 10 grams. temperature of the resulting compound (PVC compound type 2) was reduced to 80° C. by cooling the water in the jacket.

The compositions of Examples 1 to 12 and Comparative Examples 1 to 6 are summarized in Table 3, and the

TABLE 2

| Code | Product name | Chemical name | Manufacturer | phr |
|---|---|---|---|---|
| PVC (K50) | Shintec SE450 | PVC homo polymer (K value = 50) | Shintec Inc. | 90 |
| PVC-VA (K58) | Kanevinyl MB1008 | PVC - Vinyl acetate copolymer (K value = 58, Vinyl acetate = 10%) | KANEKA CORPORATION | 10 |
| CaZn | NAFTSAFE CZ3017 | Calcium zinc stabilizer | Chemson | 2.5 |
| CaSt | SC-100 | Calcium stearate | SAKAI CHEMICAL INDUSTRY | 0.5 |
| RL165 | Rheolub RL-165 | Paraffin wax | Honeywell | 0.6 |
| ACPE | ACPE-629A | Oxidized polyethylene wax | Allied Signal Corporation | 0.3 |
| CaCO$_3$-B | Omyacarb UFT | Calcium carbonate Surface treated Average particle size = 0.7 micrometer | OMYA | 100 |
| CPE | Tyrin 3615P | Chlorinated polyethylene | Dow chemical | 7 |
| Processing Aid* | | | | 3 |

*As the Processing Aid, one of Processing Aid N2 and C1 was used

To produce PVC compound type 2, PVC (K50), PVC-VA (K58), and CaZn were added to a henschel mixer and mixed. Temperature was started to increase by flowing a stream in a jacket of the mixer. CaSt, RL165, and ACPE were added at 60° C.; the Processing Aid, CPE, and CaCO$_3$-B were added at 90° C.; and the mixer was stopped at 105° C. The compositions of Example 7 and Comparative Example 13 are summarized in Table 4. In Tables 3 and 4, BA indicates butyl acrylate, ST indicates styrene, MMA indicates methyl methacrylate, MAA indicates methacrylic acid, and tDM indicates tertiary dodecyl mercaptan.

| Example | | CE1 | CE2 | E1 | E2 | E3 | E4 | E5 | CE3 | E6 |
|---|---|---|---|---|---|---|---|---|---|---|
| Processing Aid | | C1 | C2 | N0 | N1 | N2 | N3 | N4 | N5 | N6 |
| Seed | BA (%) | 0.50 | 0.50 | 0.50 | 0.50 | 0.50 | 0.50 | 0.50 | 0.50 | 0.50 |
| Monomer | ST (%) | 0.50 | 0.50 | 0.50 | 0.50 | 0.50 | 0.50 | 0.50 | 0.50 | 0.50 |
| | Total (parts) | 1.00 | 1.00 | 1.00 | 1.00 | 1.00 | 1.00 | 1.00 | 1.00 | 1.00 |
| Monomer mixture in Step 1 | MMA (%) | 95.00 | | | | | | | | |
| | BA (%) | 5.00 | 5.00 | 5.00 | 5.00 | 5.00 | 5.00 | 5.00 | 5.00 | 5.00 |
| | MAA (%) | | | 0.30 | 1.00 | 3.00 | 5.00 | 8.00 | 12.00 | 3.00 |
| | ST (%) | | 95.00 | 94.70 | 94.00 | 92.00 | 90.00 | 87.00 | 83.00 | 92.00 |
| | tDM phr | | | | | | | | | |
| | Total (parts) | 84.00 | 84.00 | 84.00 | 84.00 | 84.00 | 84.00 | 84.00 | 84.00 | 79.00 |
| | Temp (degC.) | 65 | 65 | 65 | 65 | 65 | 65 | 65 | 65 | 65 |
| Monomer mixture in Step 2 | MMA (%) | 50.00 | 50.00 | 50.00 | 50.00 | 50.00 | 50.00 | 50.00 | 50.00 | 50.00 |
| | BA (%) | 50.00 | 50.00 | 50.00 | 50.00 | 50.00 | 50.00 | 50.00 | 50.00 | 50.00 |
| | Total (parts) | 15.00 | 15.00 | 15.00 | 15.00 | 15.00 | 15.00 | 15.00 | 15.00 | 20.00 |
| Conversion rate (%) | | 99.1 | 98.4 | 98.8 | 98.3 | 98.6 | 99.0 | 98.7 | 98.4 | 98.5 |
| Latex particle size (Å) | | 2214 | 2195 | 2231 | 2221 | 2210 | 2235 | 2190 | 2215 | 2210 |
| Molecular weight (million) | | 2.80 | 2.75 | 2.65 | 2.71 | 2.63 | 2.52 | 2.64 | 2.70 | 2.69 |

| Example | | CE4 | E7 | E8 | E9 | E10 | CE5 | E11 | CE6 | E12 |
|---|---|---|---|---|---|---|---|---|---|---|
| Processing Aid | | C3 | N7 | N8 | N9 | N10 | C1 | N2 | C1 | N2 |
| Seed | BA (%) | 0.50 | 0.50 | 0.50 | 0.50 | 0.50 | 0.50 | 0.50 | 0.50 | 0.50 |
| Monomer | ST (%) | 0.50 | 0.50 | 0.50 | 0.50 | 0.50 | 0.50 | 0.50 | 0.50 | 0.50 |
| | Total (parts) | 1.00 | 1.00 | 1.00 | 1.00 | 1.00 | 1.00 | 1.00 | 1.00 | 1.00 |
| Monomer mixture in Step 1 | MMA (%) | | | | | | 95.00 | | 95.00 | |
| | BA (%) | 5.00 | 5.00 | 5.00 | 5.00 | 5.00 | 5.00 | 5.00 | 5.00 | 5.00 |
| | MAA (%) | 3.00 | 3.00 | 3.00 | 3.00 | 3.00 | | 3.00 | | 3.00 |

-continued

|  |  |  |  |  |  |  |  |  |  |
|---|---|---|---|---|---|---|---|---|---|
| ST (%) | 92.00 | 92.00 | 92.00 | 92.00 | 92.00 | 92.00 |  | 92.00 |  |
| tDM phr | 0.20 | 0.03 |  |  |  |  |  |  |  |
| Total (parts) | 79.00 | 79.00 | 79.00 | 79.00 | 79.00 | 84.00 | 84.00 | 84.00 | 84.00 |
| Temp (degC.) | 80 | 80 | 80 | 70 | 60 | 65 | 65 | 65 | 65 |
| Monomer mixture in Step 2 MMA (%) | 50.00 | 50.00 | 50.00 | 50.00 | 50.00 | 50.00 | 50.00 | 50.00 | 50.00 |
| BA (%) | 50.00 | 50.00 | 50.00 | 50.00 | 50.00 | 50.00 | 50.00 | 50.00 | 50.00 |
| Total (parts) | 20.00 | 20.00 | 20.00 | 20.00 | 20.00 | 15.00 | 15.00 | 15.00 | 15.00 |
| Conversion rate (%) | 99.8 | 99.6 | 99.3 | 99.0 | 98.9 | 98.7 | 98.6 | 98.9 | 98.5 |
| Latex particle size (Å) | 2235 | 2189 | 2187 | 2341 | 2224 | 2218 | 2192 | 2120 | 2191 |
| Molecular weight (million) | 0.23 | 0.83 | 1.49 | 2.10 | 3.67 | 2.80 | 2.63 | 2.80 | 2.63 |

TABLE 4

|  |  | Example | |
|---|---|---|---|
|  |  | CE7 | E13 Processing Aid |
|  |  | C1 | N2 |
| Seed Monomer | BA (%) | 0.50 | 0.50 |
|  | ST (%) | 0.50 | 0.50 |
|  | Total (parts) | 1.00 | 1.00 |
| Monomer mixture in Step 1 | MMA (%) | 95.00 |  |
|  | BA (%) | 5.00 | 5.00 |
|  | MAA (%) |  | 3.00 |
|  | ST (%) |  | 92.00 |
|  | tDM (phr) | 0 |  |
|  | Total (parts) | 84.00 | 84.00 |
|  | Temp (deg C.) | 65 | 65 |
| Monomer mixture in Step 2 | MMA (%) | 50.00 | 50.00 |
|  | BA (%) | 50.00 | 50.00 |
|  | Total (parts) | 15.00 | 15.00 |
| Conversion rate (%) |  | 98.7 | 98.9 |
| Latex particle size (Å) |  | 2212 | 2199 |
| Molecular weight (million) |  | 2.80 | 2.63 |

<Evaluation of Fusion Behaviors>

Fusion behaviors of the PVC compounds of Examples 1 to 13 and Comparative Examples 1 to 7 were measured by using a batch type mixer (lab plasticizer) supplied by Brabender GmbH & Co KG.

70 g of the PVC compound in the powder form was placed in the mixer at a chamber temperature of 140° C. at a screw rotation speed of 30 rpm. The following speed and torque were measured for each of the PVC compounds and summarized in Table 5 below.

(Time at Max Torque)

The time at max torque indicates the time (in minutes) required to reach a maximum torque. A compound that can quickly reach a maximum torque may be desirable to increase the production speed of a product from the compound.

(Max Torque)

The max torque is a maximum torque (in mg) while mixing the PVC compound in the mixer. A compound exhibiting high maximum torque may be desirable to uniformly melt the compound.

(Fusion Speed)

The fusion speed is the speed (mg/min) until the PVC compound reaches a max torque, and calculated by dividing the max torque by the time at max torque. A larger fusion speed indicates that the components of the PVC compound has better processing ability.

(Temperature at Max Torque)

The temperature at max torque is a temperature (in ° C.) of the PVC compound at the max torque.

(Constant Torque)

The constant torque indicates a torque (in mg) at 10 minutes from the addition of the PVC compound in the mixer.

(Temperature at Constant Torque)

The temperature at constant torque is a temperature (in ° C.) of the PVC compound at the constant torque.

TABLE 5

| Example | CE1 | CE2 | E1 | E2 | E3 | E4 | E5 | CE3 | E6 | CE4 |
|---|---|---|---|---|---|---|---|---|---|---|
| Fusion speed (mg/min) | 13.8 | 11.4 | 16.6 | 21.2 | 34.6 | 28.0 | 18.8 | 8.9 | 37.6 | 9.2 |
| Time at max torque (min) | 110 | 125 | 92 | 76 | 55 | 65 | 88 | 155 | 50 | 135 |
| Max torque (mg) | 1522 | 1420 | 1530 | 1610 | 1903 | 1822 | 1654 | 1380 | 1880 | 1240 |
| Temp at max torque (° C.) | 131 | 131 | 132 | 132 | 132 | 132 | 131 | 131 | 132 | 132 |

TABLE 5-continued

| | | | | | | | | | | |
|---|---|---|---|---|---|---|---|---|---|---|
| Const. torque (mg) | 1177 | 935 | 1033 | 1083 | 1075 | 1077 | 1039 | 902 | 1044 | 635 |
| Temp at const. torque (°C) | 142 | 142 | 143 | 143 | 143 | 143 | 143 | 141 | 142 | 141 |

| Example | E7 | E8 | E9 | E10 | CE5 | E11 | CE6 | E12 | CE7 | E13 |
|---|---|---|---|---|---|---|---|---|---|---|
| Fusion speed (mg/min) | 34.7 | 40.2 | 36.9 | 27.5 | 6.4 | 23.6 | 4.9 | 14.6 | 13.7 | 24.0 |
| Time at max torque (min) | 45 | 43 | 48 | 67 | 214 | 74 | 276 | 106 | 154 | 92 |
| Max torque (mg) | 1560 | 1730 | 1770 | 1843 | 1361 | 1745 | 1354 | 1547 | 2103 | 2206 |
| Temp at max torque (°C) | 132 | 132 | 132 | 132 | 134 | 135 | 137 | 136 | 178 | 175 |
| Const. torque (mg) | 1003 | 1030 | 1038 | 1120 | 1134 | 1209 | 1162 | 1202 | 1464 | 1438 |
| Temp at const. torque (°C) | 142 | 142 | 142 | 142 | 142 | 143 | 141 | 143 | 190 | 192 |

Figure 2:
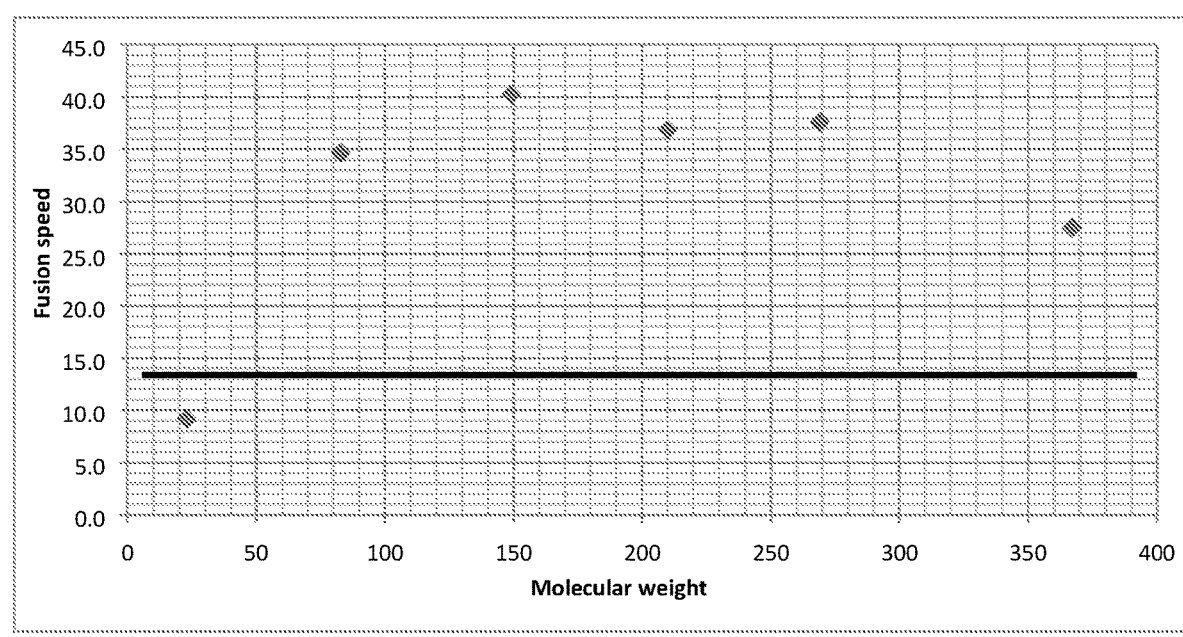
FIG. 2 shows relationship between the fusion speed of the PVC compound and the styrene-equivalent weight average molecular weight of the processing aid in Examples 6 to 10 and Comparative Example 4. The plots from left to right: Comparative Example 4, Example 7, Example 8, Example 9, Example 6, and Example 10. The bold line indicates the fusion speed of Comparative Example 1.

With respect to Examples 1 to 5 and Comparative Examples 2 and 3, the relationship between the fusion speed and the amount of methacrylic acid added in Step 1 of the production of the Processing Aid is shown in FIG. 1. With respect to Examples 6 to 10 and Comparative Example 4, the relationship between the fusion speed and the styrene-equivalent weight average molecular weight of the processing aid is shown in FIG. 2.

As shown in Table 5, the PVC compounds of Examples 1 to 13 containing styrene, a methacrylic acid, and butyl acrylate exhibit higher fusion speed as compared to Comparative Examples 1 to 7. The PVC compounds of Comparative Examples 1, 5, 6, and 7 prepared by using Processing Aid C1, which does not contain a sufficient amount of styrene, exhibited a relatively low fusion speed. Comparative Example 2, which does not contain a sufficient amount of an acid group-containing monomer in the Processing Aid, and Comparative Example 3, which contains an excessive amount of an acid group-containing monomer in the Processing Aid, exhibited the fusion speed of 11.4 mg/min and 8.9 mg/min, respectively. The results in Table 5 and FIG. 1 show possible effect of the amount of an acid group-containing monomer in the Processing Aid on the fusion speed of the PVC compound. As shown in Table 5 and FIG. 2, Comparative Example 4 having a relatively low styrene-equivalent weight average molecular weight also exhibited a relatively low fusion speed.

Thus, the foregoing discussion discloses and describes merely exemplary embodiments of an object of the present disclosure. As will be understood by those skilled in the art, an object of the present disclosure may be embodied in other specific forms without departing from the spirit or essential characteristics thereof. Accordingly, the present disclosure is intended to be illustrative, but not limiting of the scope of an object of the present disclosure as well as the claims.

Numerous modification and variations on the present invention are possible in light of the above teachings. It is therefore to be understood that within the scope of the appended claims, the invention may be practiced otherwise than as specifically described herein.

The invention claimed is:

1. A thermoplastic resin composition, comprising:
   100 parts by weight of at least one thermoplastic resin (A); and
   from 0.1 to 30 parts by weight of at least one processing aid (B),
   wherein the at least one processing aid (B) has a styrene-equivalent weight average molecular weight of from 300,000 to 8,000,000, and
   wherein the at least one processing aid (B) comprises at least 60 wt % of a polymer (B1) obtained by polymerizing monomers comprising from 40 to 99.9 wt % of styrene, from 1 to 7 wt % of at least one acid group-containing monomer, and from 0 to 59.9 wt % of at least one vinyl monomer.

2. The thermoplastic resin composition of claim 1, wherein the at least one thermoplastic resin (A) is a vinyl chloride resin.

3. The thermoplastic resin composition of claim 1, further comprising:
   at least one filler (C).

4. The thermoplastic resin composition of claim 3, comprising from 5 to 800 phr of the at least one filler (C).

5. The thermoplastic resin composition of claim 1, wherein the at least one acid group-containing monomer comprises acrylic acid, methacrylic acid, or a combination thereof.

6. The thermoplastic resin composition of claim 1, wherein the polymer (B1) is obtained by polymerizing monomers comprising from 50 to 99.5 wt % of styrene, from 1 to 7 wt % of at least one acid group-containing monomer, and from 0 to 49.9 wt % of at least one vinyl monomer.

7. The thermoplastic resin composition of claim 1, wherein the at least one polymer (B1) is obtained by polymerizing monomers comprising from 60 to 99 wt % of styrene, from 1 to 7 wt % of at least one acid group-containing monomer, and from 0 to 39.9 wt % of at least one vinyl monomer.

8. The thermoplastic resin composition of claim 1, wherein the at least one polymer (B1) is obtained by polymerizing monomers comprising from 70 to 98.5 wt % of styrene, from 1.5 to 4 wt % of at least one acid group-containing monomer, and from 0 to 29.9 wt % of at least one vinyl monomer.

9. The thermoplastic resin composition of claim 1, wherein the at least one polymer (B1) is obtained by polymerizing monomers comprising from 80 to 98 wt % of styrene, from 2 to 3 wt % of at least one acid group-containing monomer, and from 0 to 19.9 wt % of at least one vinyl monomer.

10. The thermoplastic resin composition of claim 3, wherein:
the at least one thermoplastic resin (A) is a vinyl chloride resin,
an amount of the at least one tiller (C) is from 5 to 800 phr, and
the at least one polymer (B1) is obtained by polymerizing monomers comprising from 80 to 98 wt % of styrene, from 2 to 3 wt % of at least one acid group-containing monomer, and from 0 to 19.9 wt % of at least one vinyl monomer.

11. A thermoplastic resin compound, obtained by melting and kneading the thermoplastic resin composition of claim 1.

12. A method of improving processing ability of a thermoplastic resin, the method comprising:
adding from 0.1 to 30 parts by weight of at least one processing aid to 100 parts by weight of at least one thermoplastic resin,
wherein the at least one processing aid has a styrene-equivalent weight average molecular weight of from 300,000 to 8,000,000, and
wherein the at least one processing aid comprises at least 60 wt % of a polymer obtained by polymerizing monomers comprising from 40 to 99.9 wt % of styrene, from 1 to 7 wt % of at least one acid group-containing monomer, and from 0 to 59.9 wt % of at least one vinyl monomer.

13. A method of improving processing ability of a polyvinyl chloride resin composition, the method comprising:
adding at least one processing aid to a polyvinyl chloride resin composition comprising a polyvinyl chloride resin and at least one filler,
wherein:
from 0.1 to 30 parts by weight of the at least one processing aid is added to 100 parts by weight of the polyvinyl chloride resin composition,
the at least one processing aid has a styrene-equivalent weight average molecular weight of from 300,000 to 8,000,000, and
the at least one processing aid comprises at least 60 wt % of a polymer obtained by polymerizing monomers comprising from 40 to 99.9 wt % of styrene, from 1 to 7 wt % of at least one acid group-containing monomer, and from 0 to 59.9 wt % of at least one vinyl monomer.

14. The thermoplastic resin composition of claim 1, wherein the at least one processing aid (B) further comprises a polymer (B2), a polymer (B3) or a combination thereof.

15. The thermoplastic resin composition of claim 1, wherein the at least one processing aid (B) further comprises a polymer (B2), wherein the polymer (B2) is obtained by polymerizing monomers comprising from 20 to 80% by weight of a methacrylate monomer, from 20 to 80% by weight of an acrylate monomer, and from 0 to 40% by weight of a vinyl monomer other than styrene.

16. The thermoplastic resin composition of claim 1, wherein the at least one processing aid (B) further comprises a polymer (B3), wherein the polymer (B3) is obtained by polymerizing monomers comprising from 70 to 100% by weight of a methacrylate monomer, 0 to 30% by weight of an acrylate monomer, and 0 to 30% by weight of a vinyl monomer other than styrene.

17. The thermoplastic resin composition of claim 1, wherein the at least one processing aid (B) further comprises a polymer (B2) and a polymer (B3), wherein the polymer (132) is obtained by polymerizing monomers comprising from 20 to 80% by weight of a methacrylate monomer, from 20 to 80% by weight of an acrylate monomer, and from 0 to 40% by weight of a vinyl monomer other than styrene, and
the polymer (B3) is obtained by polymerizing monomers comprising from 70 to 100% by weight of a methacrylate monomer, 0 to 30% by weight of an acrylate monomer, and 0 to 30% by weight of a vinyl monomer other than styrene.

18. The thermoplastic resin composition of claim 1, wherein the at least one acid group-containing monomer is acrylic acid or methacrylic acid.

19. The thermoplastic resin composition of claim 1, wherein the at least one acid group-containing monomer is at least one selected from the group consisting of maleic anhydride, itaconic acid, fumaric acid, and mesaconic acid.

20. The thermoplastic resin composition of claim 1, wherein
the at least one vinyl monomer in the polymer (B1) is selected form the group consisting of a (meth)acrylate monomer, vinyl arene monomer except styrene, vinyl cyane, vinyl halide, vinyl acetate, alkene, alkyne, and a combination thereof, and
a content of the least one vinyl monomer in the polymer (B1) is from 19.9 to 59.9 wt. %.

* * * * *